US012669837B2

(12) United States Patent
Yan et al.

(10) Patent No.: US 12,669,837 B2
(45) Date of Patent: Jun. 30, 2026

(54) SYSTEMS AND DEVICES OF ISOLATED VOLTAGE REGULATORS

(71) Applicant: Arm Limited, Cambridge (GB)

(72) Inventors: Yimajian Yan, Santa Clara, CA (US);
Mikael Yves Marie Rien, Claix (FR);
Javier DeLaCruz, San Jose, CA (US);
Rainer Herberholz, Great Abington
(GB)

(73) Assignee: Arm Limited, Cambridge (GB)

( * ) Notice: Subject to any disclaimer, the term of this
patent is extended or adjusted under 35
U.S.C. 154(b) by 96 days.

(21) Appl. No.: 18/439,234

(22) Filed: Feb. 12, 2024

(65) Prior Publication Data

US 2025/0258510 A1     Aug. 14, 2025

(51) Int. Cl.
| | |
|---|---|
| *H02M 3/07* | (2006.01) |
| *G05F 1/56* | (2006.01) |
| *H02M 1/14* | (2006.01) |
| *H02M 3/158* | (2006.01) |

(52) U.S. Cl.
CPC ............... *G05F 1/56* (2013.01); *H02M 1/14*
(2013.01); *H02M 3/07* (2013.01); *H02M
3/158* (2013.01)

(58) Field of Classification Search
CPC ...................... H02M 3/07–077; H02M 3/1384
See application file for complete search history.

(56) References Cited

U.S. PATENT DOCUMENTS

| | | | | |
|---|---|---|---|---|
| 10,833,579 | B1 * | 11/2020 | Puggelli | ................... G06F 1/26 |
| 11,990,839 | B2 * | 5/2024 | Parto | ................... H02M 1/0009 |

| | | | | |
|---|---|---|---|---|
| RE50,103 | E * | 8/2024 | Puggelli | ................ H02M 3/072 |
| 2016/0308443 | A1 * | 10/2016 | Crossley | ................ H02M 3/158 |
| 2017/0300079 | A1 * | 10/2017 | Puggelli | .................. H02M 3/07 |
| 2018/0358896 | A1 * | 12/2018 | Puggelli | ................ H02M 3/158 |
| 2020/0204076 | A1 * | 6/2020 | Melanson | ........... H02M 3/1582 |
| 2022/0302830 | A1 * | 9/2022 | Shrivastava | ............ H02M 3/07 |
| 2023/0223844 | A1 * | 7/2023 | Yang | ....................... H02M 3/07 |
| | | | | 363/60 |
| 2023/0231473 | A1 * | 7/2023 | Cho | .................... H02M 1/0043 |
| | | | | 713/340 |
| 2023/0261571 | A1 * | 8/2023 | Ursino | ................ H02M 1/0074 |
| | | | | 323/282 |
| 2025/0224430 | A1 * | 7/2025 | Jong | .................. G01R 19/0092 |
| 2025/0279714 | A1 * | 9/2025 | Yan | .................. H02M 3/33569 |

FOREIGN PATENT DOCUMENTS

CN            116073648      * 12/2022

* cited by examiner

*Primary Examiner* — Sisay G Tiku
(74) *Attorney, Agent, or Firm* — Pramudji Law Group
PLLC; Ari Pramudji

(57) ABSTRACT

According to an implementation, a circuit includes a trio of
first switches, a pair of second switches, a pair of inductors
including a primary inductor and a secondary inductor, and
a first capacitor, where: the circuit is configured to regulate
a load. According to an implementation, a circuit includes a
voltage balancer and two or more stages. Each stage of the
two or more stages includes: a two-phase isolated voltage
regulator (IVR) including at least a pair of inversely coupled
dual inductors and a differential voltage input, and a respec-
tive Zener diode and capacitor combination coupled to the
voltage balancer and the first two-phase IVR. In certain
aspects, the two or more stages are coupled in series.

20 Claims, 10 Drawing Sheets

SYSTEMS AND DEVICES OF ISOLATED VOLTAGE REGULATORS

FIELD

This disclosure pertains to systems and devices involving isolated voltage regulator (IVR) circuits.

DESCRIPTION OF RELATED ART

This section is intended to provide information relevant to understanding various technologies described herein. As the section's heading implies, this is a discussion of related art that in no way implies that the discussion is prior art. Generally, related art may or may not be considered prior art. Any statement in this section should be read in this light, and not as admission of prior art.

In the context of electrical or electronic design, a voltage regulator (VR) is an integrated circuit (IC) or a component within an electronic device responsible for maintaining a stable and specific voltage level within the device or a particular subsystem. For example, when an input voltage varies due to fluctuations in the power supply or environmental conditions, a VR can provide a steady and regulated output voltage to power various components of a device. Furthermore, the output voltage regulation can ensure proper and reliable operation of electronic circuits, for example, in sensitive components like microprocessors, memory modules, or other integrated circuits. Additionally, VRs can be useful, for example, working with microcontrollers, power management ICs, or various other electronic devices to dynamically adjust or statically locate a proper voltage applied to them to achieve certain performance (e.g., to be able to run certain application with certain clock frequency) or power consumption.

BRIEF DESCRIPTION OF THE DRAWINGS

Implementations of various techniques are described herein with reference to the accompanying drawings. The accompanying drawings illustrate various implementations described herein and are not meant to limit implementations of various techniques described herein.

Figure 1A:
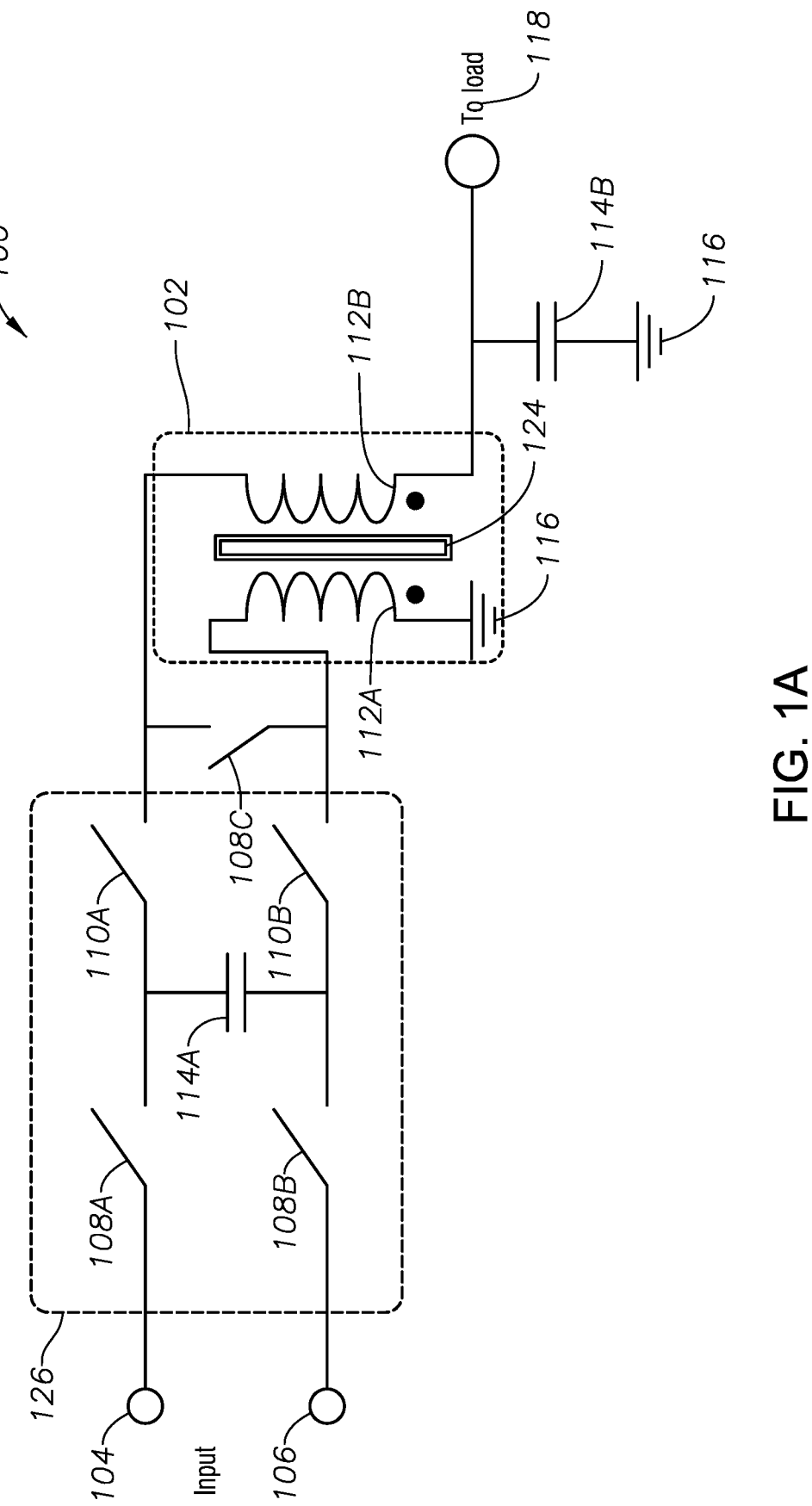
FIG. 1A is a diagram, in accordance with certain implementations.

Reference is made in the following detailed description to accompanying drawings, that form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other implementations may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, and the like), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

According to one implementation of the present disclosure, a circuit (i.e., isolated voltage regulator (IVR) architecture) includes a trio of first switches, a pair of second switches, a pair of (e.g., coupled) inductors including a primary inductor and a secondary inductor, and a first capacitor, where: the circuit is configured to regulate a load.

According to another implementation of the present disclosure, a circuit (i.e., two-phase IVR having dual coupled inductors) includes a differential voltage input (e.g., at an input side of the circuit) including first and second nodes, where the first and the second nodes can be configured to receive respective first and second voltages. The circuit further includes a first isolated voltage regulator (IVR) including a first pair of (e.g., coupled) inductors, and a second IVR including a second pair of (e.g., coupled) inductors, where the first and the second pair of (coupled) inductors (e.g., share a magnetic core) can be inversely coupled (e.g., can be configured to reduce magnetic core loss and to reduce output voltage ripple noise).

According to another implementation of the present disclosure, a circuit (i.e., input stacked Voltage Regulator architecture (SIVR)) includes a voltage balancer and two or more stages. Each stage of the two or more stages includes: a two-phase isolated voltage regulator (IVR) including at least a pair of inversely coupled dual inductors and a differential voltage input, and a respective Zener diode and capacitor combination coupled to the voltage balancer and the first two-phase IVR. In certain aspects, the two or more stages are coupled in series.

Schemes and techniques outlined herein pertain to innovative IVR circuits for input-stacking that converts 'high' input voltages (i.e., greater than 2 volts) to a chip-level voltage (i.e., less than or equal to 2 volts). In certain implementations, advantageously, the innovative IVR circuits are designed for but not limited to 'per-core regulation', allowing for independent individual control and adjustment of voltage for each core or specific sections within a chip. In certain implementations, the innovative IVRs can be paired, stacked, and interconnected in series to achieve a "large" "conversion ratio" with "good" efficiency exceeding 95%, since the stacking of the input voltages of the IVRs substitutes the conversion and regulation of their input voltages in a traditional cascaded power supply system. Beneficially, this configuration ensures 'good' energy density, signifying efficient energy utilization within a compact physical footprint. Further, this efficiency can outperform traditional buck converters while occupying a notably smaller space or volume. Advantageously, this reduction in space utilization is notably significant when compared to other traditional cascaded power supply system used in, for example, servers, PCIE cards, accelerator cards, and similar devices, where the power conversion components and related circuits may occupy over 50% of the board area and limits the functionality of the product.

Favorably, according to inventive aspects, the innovative IVR circuit provides isolation for logic gates operating at low voltages in contrast with previous on-die voltage stacking schemes where logic gates remained exposed to high input voltages, where at least three problems occur: first, the PDN (power distribution network) of each core or section of the IC is weakened, especially for the ground net (or return path of the circuit), introducing more risk of ground bounce; second, level shifting circuits are required to enable communication between cores or different sections of the IC, making the digital design more complex; third, there will still be logic gates facing high voltages, limiting either the number of stacked stages or the process technology node. Additional inventive schemes and techniques center around an innovative IVR design featuring inductors significantly 'smaller' (i.e., an order of magnitude; 10×) in size compared to conventional buck converters. Suitably, this implementation can provide for an in-package or in-PCB solution (i.e., integrating or incorporating specific components, functionalities, or systems within a single packaging substrate or printed circuit board or other types of enclosure). Additionally, the reduced size of the inductors can translate to a faster response when addressing voltage droops. Alternatively stated, smaller inductors can offer benefits in managing voltage fluctuations due to faster load transients which occur more often in high-end computing circuits.

Certain definitions have been provided herein for reference. Power integrity in circuit design refers to the ability of a circuit or system to consistently deliver stable and 'clean' power to components. Further, power integrity can encompass various aspects related to ensuring that the voltage levels across the circuitry remain within specified tolerances and that the power supply noise and fluctuations may be minimized. Additionally, power integrity and power supply design (i.e., the process of creating and implementing systems that provide electrical power to various devices, equipment, or circuits) can be considered together in decision-making for determining and delivering chip voltage.

In systems with multiple cores in a limited space, power density (i.e., the amount of power (i.e., usually measured in watts) that can be generated or handled per unit of volume or surface area) are dramatically increasing. Further, the current in the power delivery path (i.e., the route or trace within an electronic circuit or system through which electrical power can be supplied from a power source (i.e., such as a battery or a power supply) to the various components and subsystems that use electrical power) can increase as well. As the power density and current in the power delivery path increase, at least two problems can occur. First, the direct current (DC) loss (i.e., the loss of electrical power or voltage that can occur within a system or a circuit as DC travels through various components or transmission lines) would increase. Second, VRs may not respond fast enough to a 'large' load step (i.e., a significant and sudden change or variation in the electrical load in the computation core, when running certain code or software), causing a 'large' voltage drop or surge which may even stops the system.

In certain aspects, advantageously, innovative IVR schemes, as described herein, can convert high voltage to chip-level low voltage 'close to' the load. Therefore, most of the path from the innovative IVR to the load logic gates can be delivered with higher voltage, less current, and less current load steps. Furthermore, the innovative IVRs also help to enable per-core DVFS (i.e., Dynamic Voltage and Frequency Scaling; a power management technique used in electronic systems, such as, for example, processors and integrated circuits, to optimize energy efficiency and performance by dynamically adjusting the operating voltage and clock frequency based on workload demands) so that each core can operate at the core's best performance per watt depending on workloads.

One issue with traditional integrated VRs (e.g., herein 'integrated' corresponds to the VR that is located together with silicon and packaging substrate) is the 'large' power loss in both on-board (e.g., from 12V/48V to 1.8V) conversions for the integrated VR input and chip-level low voltage conversions (e.g., from 1.8V to logic). In specific scenarios where enhancing efficiency or maintaining the same conversion ratio is the goal, a tradeoff occurs; namely, increasing the conversion ratio or preserving efficiency might demand sacrificing energy density. Such a tradeoff is undesirable since maximizing board space could be a priority, and the "tightness" (e.g., scarcity) of available board space poses challenges.

FIG. 1A is a diagram of an example IVR circuit 100, in accordance with some implementations. As illustrated in FIG. 1A, the example IVR circuit 100 can include a differential voltage input, where the differential voltage input can be configured to provide a differential voltage as an input voltage (i.e., usable by the example IVR circuit 100 to regulate and stabilize an output voltage). Further, the differential voltage can include a first node 104 and a second node 106, where the first node 104 and the second node 106 can be configured to receive respective first and second voltages. Also, the example IVR circuit 100 can include: a trio of switches 108A, 108B, and 108C, a pair of switches 110A and 110B, a pair of coupled inductors 102 including a primary inductor 112A and a secondary inductor 112B, and a fly capacitor 114A. Additionally, the example IVR circuit 100 can be configured to output a regulated differential voltage to a load 118.

As illustrated in FIG. 1A, the example IVR circuit 100 can provide an output voltage to a stabilizing capacitor 114B that can be configured to stabilize the output voltage by 'smoothing out' ripples and variations in the output voltage. Further, the stabilizing capacitor 114B can be coupled to a third voltage (i.e., a ground 116), the secondary inductor 112B and the load 118.

In certain implementations, the switches 108A, 108B, 110A, and 110B as well as the fly capacitor 114A can create a 1:1 switch capacitor (SC) converter 126. The 1:1 SC voltage converter 126 can be a type of voltage conversion circuit that maintains a 1:1 ratio between the input voltage (i.e., the differential voltage) and output voltage (i.e., the fly capacitor voltage). In this configuration, the differential voltage can be stored temporarily in the fly capacitor 114A during switching cycles. As an example, it would not be required to have a time duration that the combination of switch 108A and 108B is "on" be equal to the time duration that the combination of switch 110A and 110B.

In an example operation of the example IVR circuit 100, when the switches 108A and 108B closed, a first conductive pathway can be established. The first conductive pathway can include the first node 104, the switch 108A, the fly capacitor 114A, the switch 108B, and the second node 106. As the fly capacitor 114A is connected between the first node 104 (i.e., the first voltage) and the second node 106 (i.e., the second voltage), the fly capacitor 114A can recharge from the differential voltage. When the switches 108A and 108B open, the first conductive pathway can be disrupted. Further, the final voltage across the fly capacitor 114A can at least approximately equate to the differential voltage between the first node 104 and the second node 106.

Continuing with an example operation, when the switches 108A and 108B are closed, switch 108C in the example IVR circuit 100 also closes (i.e., synchronous with the switches 108A and 108B), and a second conductive pathway can be established. The second conductive pathway can include a third voltage (i.e., the ground 116), the primary inductor 112A, the switch 108C, the secondary inductor 112B, and the stabilizing capacitor 114B or the load 118. When the switch 108C is closed, current would flow through the pathway comprising the primary inductor 112A, the switch 108C, and the secondary inductor 112B. Since the voltage input of this loop is 0 (as connected to ground) and the output is the load voltage, the current through this pathway will decrease, and the decrease rate is dependent on the total inductance of the primary inductor 112A, secondary inductor 112B, and the mutual (coupled) inductance due to the magnetic core 124.

Continuing with an example operation, when the switch 108A, 108B, and 108C opens, the switch 110A and 110B are closed. A third pathway is then formed by the primary inductor 112A, the switch 110B, the capacitor 114A, the switch 110A, the secondary inductor 112B, and the load. Because the voltage on the capacitor 114A is larger than the voltage on the load, the current in the loop will increase, and the increase rate would be dependent on the total inductance of the primary inductor 112A, secondary inductor 112B, and the mutual (coupled) inductance due to the magnetic core 124.

Continuing with an example operation, the alterations in the positions of the combination of switches 108A, 108B, 108C and the combination of switches 110A and 110B controls the time duration of the current flowing though the inductors 112A and 112B to be increasing or decreasing. For instance, the percentage of the time duration of the inductor current to be increasing is regarded as the duty cycle. The load voltage at 118 would be approximately the same percentage as the duty cycle of the input voltage between 104 and 106. In this way, a control of the duty cycle, taking the output voltage as the input to a feedback, can regulate the load voltage at 118.

Continuing with an example operation, the fly capacitor 114A can accumulate charge from the differential voltage input through the switches 108A and 108B that connect the fly capacitor 114A to the first and second nodes 104 and 106. However, when the duty cycle is "too large", corresponding to the time duration for the switches 108A and 108B to be closed being "too short", the parasitic inductance inside the routing and the capacitor 114A would not allow enough charges to conduct to recharge the fly capacitor 114A. Accordingly, this can appear as a voltage drop on the fly capacitor cycle by cycle (but finally maintain at some level when the voltage difference between the input 104 and 106 and the fly capacitor 114A is large enough for each cycle), and so the conversion efficiency can be impacted. To overcome this, the best way is to choose the fly capacitor to be low-equivalent series inductance (low-ESL) and low equivalent series resistance (low-ESR), and minimize the parasitic inductance and resistance between input 104 and 106 and the fly capacitor 114A. The ideal implementation of such capacitor is to have an integrated circuit (IC) with all the switches (108A, 108B, 110A, 110B, and 108C) and use a metal-insulator-metal (MIM) capacitor or a deep-trench capacitor (DTC) integrated together with such an IC.

Continuing with an example operation, duty cycle can be controlled to follow the reference voltage from dynamic voltage and frequency scaling (DVFS). DVFS is a technique used in computing systems, particularly in CPUs, GPUs, and other integrated circuits, to dynamically adjust the operating voltage and clock frequency to optimize power consumption and performance based on the current workload or demand. Through scaling operating voltage and clock frequency, the example IVR circuit 100 can save power during idle or low-demand periods and ramp up performance when needed, thereby balancing energy efficiency with computational requirements. DVFS can allow individual processor cores or components within a chip (e.g., a load, such as the load 118) to adjust their operating voltage and frequency based on specific workload demands. By tailoring the voltage and frequency to the needs of each core, DVFS optimizes performance per watt for each unit. For example, during low-demand periods, DVFS can reduce the voltage and frequency of specific cores that are not heavily utilized. Advantageously, this can help reduce the total system power consumption Alternatively, when a core faces a high-demand workload or targeting at a high computing performance, DVFS can increase voltage and frequency. This adaptive approach can ensure that each core operates optimally in terms of performance and power consumption, collectively maximizing the overall efficiency of the system.

Continuing with an example operation, a computational core that requires a stable voltage input, together with its own decoupling capacitor 114B, may be represented by the load 118 connected to the coupled inductors 102. Additionally, the load 118 can be a component or system that relies on the regulated voltage output from the example IVR circuit 100 to function properly. Further, and advantageously, the operations of the load 118 in the example IVR circuit 100 can involve drawing power from the example IVR circuit 100 to perform the core's designated tasks. Moreover, the regulation and stability of the voltage output can ensure proper functionality of the core. Additionally, within a circuit, a load 118 may represent a specific component or functional block that requires power to operate. Further, the load 118 can be a section of a larger system that performs, for example, computational tasks, processes data, or manages certain functionalities. In the context of a processor or chip, the core can refer to an individual processing unit within the larger chip.

Figure 1B:
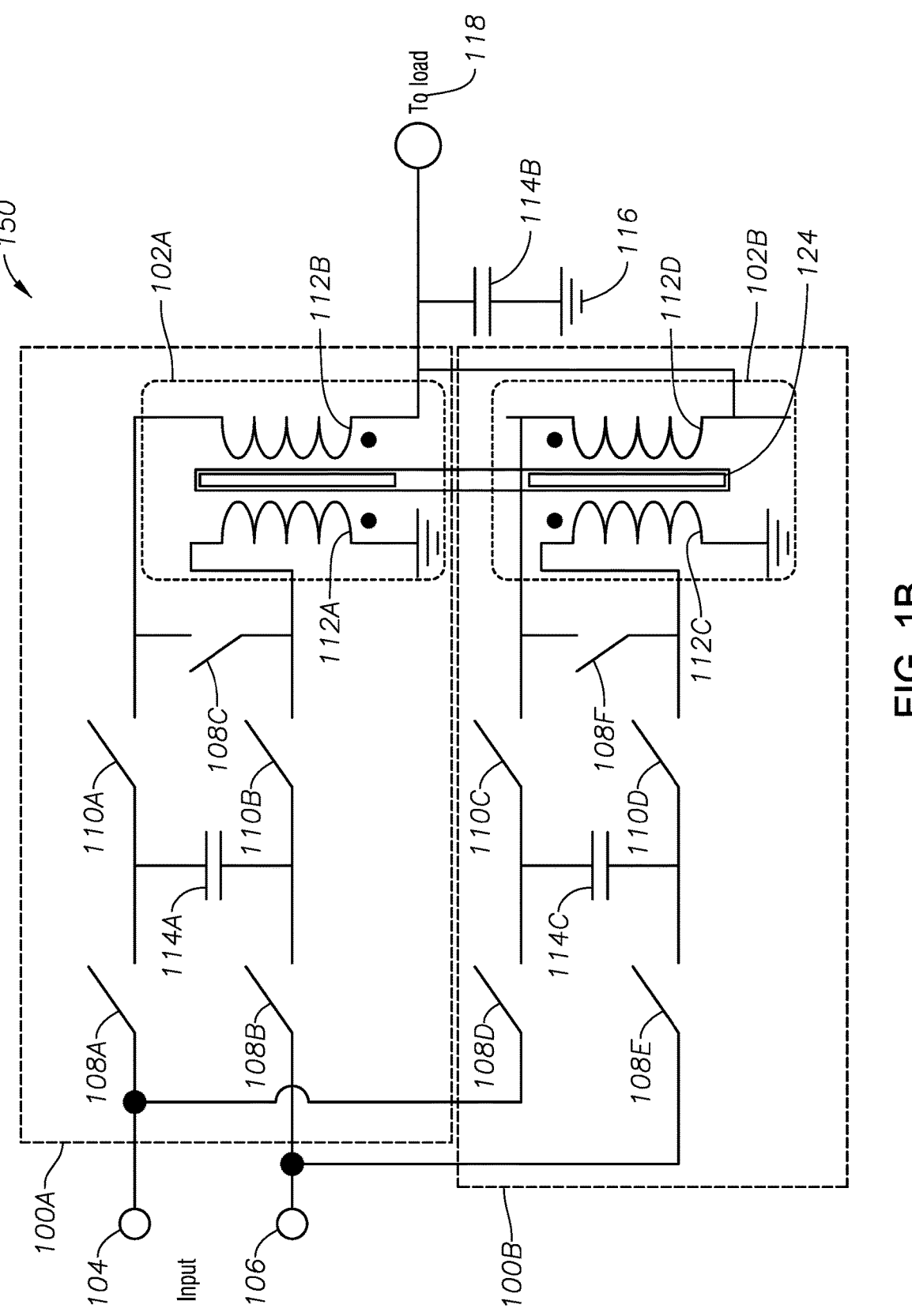
FIG. 1B is a diagram, in accordance with certain implementations.

FIG. 1B is a diagram representation of an example 2-phase IVR circuit 150 having dual coupled inductors 102A and 102B, in accordance with some implementations. As illustrated in FIG. 1B, similar elements to those of FIG. 1A may not be discussed again for the sake of brevity and conciseness. For example, the operations and configurations of switches 108D, 108E, 110C, 110D, and 108F in FIG. 1B may be identical to that of switches 108A, 108B, 110A, 110B, and 108C, as described with reference FIG. 1A, respectively; and the operations and configurations of capacitor 114C may be identical to that of capacitor 114A. Indeed, in various implementations, individually, the operations and configurations of the second IVR circuit 100B may be identical to that of the first IVR circuit 100A.

As illustrated in FIG. 1B, the example 2-phase IVR circuit 150 includes a differential voltage input that includes the first node 104 and the second node 106. Further, the example 2-phase IVR circuit 150 includes a first IVR circuit 100A that includes coupled inductors 102A. Additionally, the example 2-phase IVR circuit 150 also includes a second IVR circuit 100B that also includes coupled inductors 102B. Furthermore, the pair of coupled inductors 102A and 102B can share a magnetic core 124 and can be inversely coupled. When the pair of coupled inductors 102A and 102B are inversely coupled and share the magnetic core 124, changes in a first pair of coupled inductors can induce voltages in the second pair of coupled inductors in a manner that opposes the initial change in the first pair of coupled inductors. Alternatively said, alterations in the current passing through one pair of coupled inductors, such as the coupled inductors 102A, generate a magnetic field that can affect the other pair of coupled inductors, such as the coupled inductors 102B, through the shared magnetic core 124. The induced voltage in the second pair of coupled inductors, such as the coupled inductors 102B, opposes the initial change in current, exerting an influence that helps stabilize and/or regulate the behavior of each set of the coupled inductors 102A, 102B.

Advantageously, according to inventive aspects, the inversely coupled pairs of inductors provide specific advantages. As may be appreciated, such an inventive design can mitigate certain unwanted effects (e.g., electromagnetic interference or voltage fluctuations) and/or provide better control over the energy transfer within the circuit. By inducing opposing voltages in one pair of inductors, advantageously, the magnetic fields introduced by the opposing voltages would cancel out, and so, the output ripple current and voltage can be greatly reduced. Additionally, when a load increase happens, the increment current in one pair of the inductors will incur increment current in the other pair, no matter which pair is applied with input voltage. Accordingly, the transient performance (i.e., the voltage droop during the load increase or voltage surge during load reduction) can be improved.

In an example operation of the example 2-phase IVR circuit 150, switches 108A, 108B, and 108C should be at least approximately 180 degrees out of phase with switches 108D, 108E, and 108F. The switches 108D and 108E should be closed after the switches 108A and 108B are closed by at least approximately half of a clock period. Also, the switches 110C and 110D should be at least approximately 180 degrees out-of-phase with switches 110A and 110B. Further, the duty cycle of the switches 110A and 110B is at least substantially the same and the duty cycle of the switches 110C and 110D. This modulation can regulate the average current through the inductors delivered to the load 118, filtered by the decoupling capacitor 114B associated with the load 118; hence, effectively controlling the output voltage. Through varying the duration of time, advantageously, by the closing of the switches 110A, 110B, 110C, and 110D (e.g., according to the duty cycle), the example 2-phase IVR circuit 150 can maintain or adjust the output voltage level as needed.

In another advantage, utilizing the shared magnetic core 124 for the inversely coupled inductors 102A and 102B can reduce the physical size and weight of the example 2-phase IVR circuit 150. While generally a larger inductance value would require a larger core size, advantageously, according to inventive aspects, the magnetic fields and ripple current in the two loops may largely be canceled out with each other. Hence, in such inventive aspects, the inductance value needed would be reduced. Further, the efficiency in space utilization is particularly helpful in compact circuit designs or applications where minimizing the physical footprint is helpful.

In another advantage, the arrangement of the dual coupled inductors 102A and 102B with inverse coupling and the shared magnetic core 124 contributes to better voltage regulation, assists in managing voltage fluctuations, and aids in maintaining a stable output voltage despite variations in input or load conditions.

Figure 2:
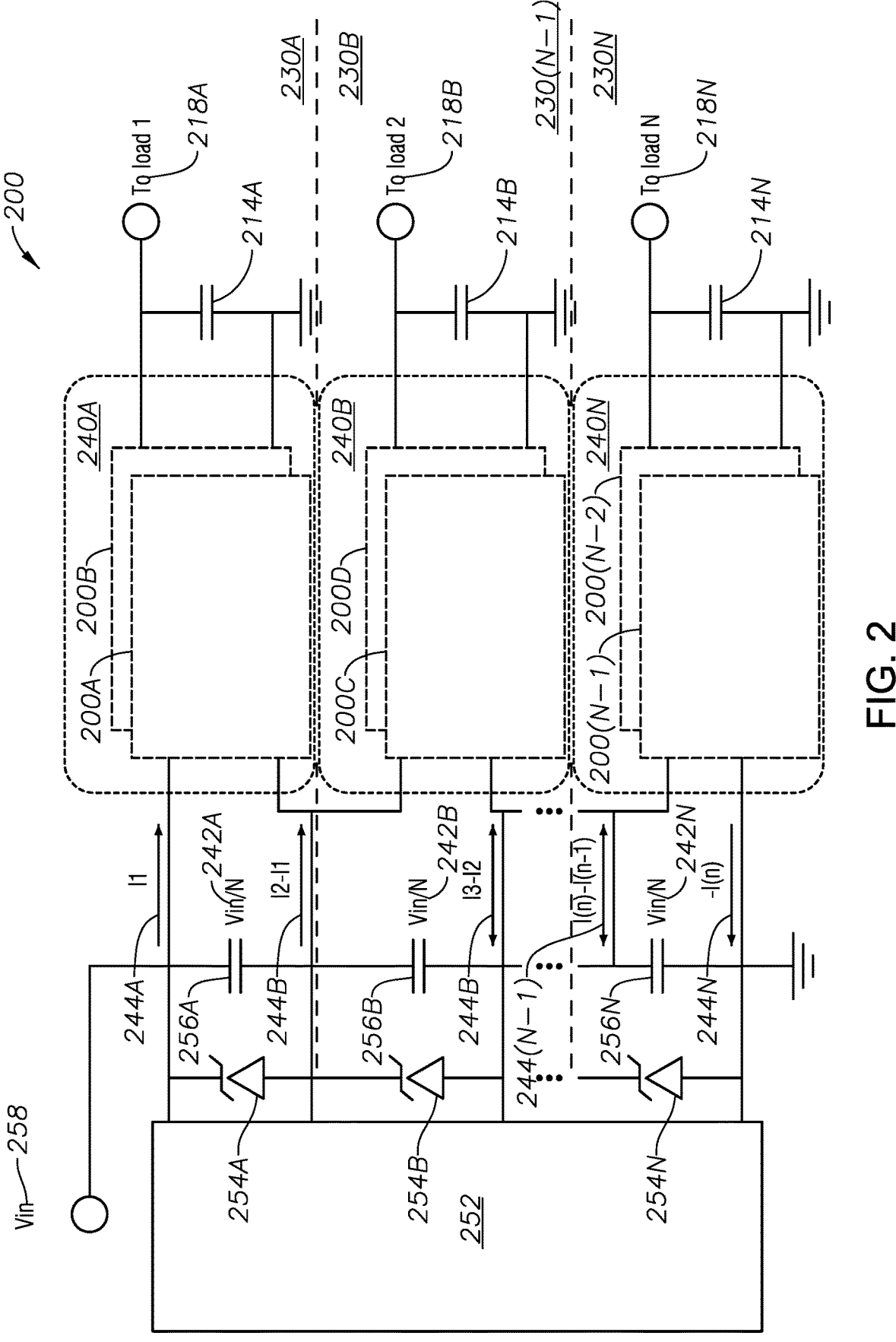
FIG. 2 is a diagram, in accordance with certain implementations.

FIG. 2 is a diagram representation of an example stacked multi-phase IVR circuit 200, in accordance with some implementations. As may be appreciated, while the stacked units are shown as 2-phase IVRs in FIG. 2, the phases may be of different quantities in other implementations. For instance, the number of phases for each stage can be 2, 4, 6, . . . N number of stages. As illustrated in FIG. 2, the example stacked 2-phase IVR circuit 200 (i.e., Stacked-input Voltage Regulator, SIVR) includes a first stage 230A including a first two-phase IVR 240A. In various implementations, the first two-phase IVR 240A can include a first IVR circuit 200A and a second IVR circuit 200B with a first pair of inversely coupled dual inductors (not shown). Advantageously, the operations and configurations of the first and second IVR circuits 200A, 200B may be identical to that of the IVR circuits 100A, 100B (as described with reference to FIG. 1B). Additionally, each IVR, such as two-phase IVR 240A and two-phase IVR 240B, is a multi-phase isolated converter. Further, the first two-phase IVR 240A can be coupled to a first differential voltage input 242A that includes a first voltage at a first node 204 and a second voltage at a second node 206. Further, the example stacked 2-phase IVR circuit 200 can include a second stage 230B that includes a second two-phase IVR 240B. The second two-phase IVR 240B can include a first IVR circuit 200C and a second IVR circuit 200D that can include a second pair of inversely coupled dual inductors (not shown). Advantageously, the operations and configurations of the first and second IVR circuits 200C, 200D may be identical to that of the first and second IVR circuits 200A, 200B. Further, the second two-phase IVR 240B can be coupled to a second differential voltage input 242B that includes the second voltage at the second node 206 and a third voltage at a third node 208. Additionally, the first stage 230A can be coupled in series to the second stage 230B.

In an example operation of the example stacked 2-phase IVR circuit 200, the first differential voltage input 242A and the second differential voltage input 242B can be approximately half of the input voltage. Therefore, as the first differential voltage input 242A to the first stage 230A and the second differential voltage input 242B to the second stage 230B can be approximately half the voltage input (not shown), then the first voltage can be equal to the voltage input, the second voltage can be equal to half of the voltage input, and the third voltage can be ground potential or zero volts.

As shown, the example stacked 2-phase IVR circuit 200 can include a voltage balancer 252 (i.e., a circuit designed to ensure equal voltage distribution or balance among multiple stages within an electrical system, commonly realized with switched-capacitor topologies). Further, the example stacked 2-phase IVR circuit 200 can include the first stage 230A including the first two-phase IVR 240A (that can include the IVRs 200A and 200B with the first pair inversely coupled dual inductors (not shown)). Additionally, the first stage 230A can include the first differential voltage input 242A, a protective (Zener) diode 254A (i.e., to allow current to flow in the forward direction (like a regular diode) but also permit current to flow in the reverse direction when the voltage reaches a specific value known as the 'Zener voltage'), and a decoupling capacitor 256A coupled to a voltage input 258 and voltage balancer 252.

As further illustrated in FIG. 2, the second stage 230B can include the second two-phase IVR 240B (that can include the second pair of IVRs 200C and 200D with inversely coupled dual inductors (not shown)). Moreover, the second stage 230B can include the second differential voltage input 242B, a protective (Zener) diode 254B, and a decoupling capacitor 256B coupled to the voltage input 258 and the voltage balancer 252. As illustrated in FIG. 2, the first stage 230A can be coupled in series to the second stage 230B, and the second stage 230B can be coupled in series with the next stage, and such a coupling can continue to the N-1 stage 230(N-1) and the N stage 230N. As may be appreciated, each of the stages 230 may be identical in circuit operation and configurations. As one example, for the two-phase IVR 240N, the operations and configurations of its respective first and second IVR circuits 200N-1, 200N-2 may be identical that of the first and second IVR circuits 200A, 200B.

In an example operation, assuming the voltage input 258 to be 12V (i.e., a general input voltage), the differential voltage at each stage of the N-stage example where N is equal to 6 can be 2V. Each stage in the series configuration of the example is a 2-phase IVR circuit 250 which is same as circuit 150, providing output voltage (218A, 218B, . . . , 218N) regulation to each load. The output voltages (218A, 218B . . . 218N) to each load will be close to half of the input voltages (242A, 242B, . . . , 242N).

In certain aspects, the differential voltage 242A in the first stage 230A can be connected to the protective Zener diode 254A and the decoupling capacitor 256A in parallel. Meanwhile, the decoupling capacitor 256A, in conjunction with the protective Zener diode 254A, can help stabilize the output voltage and smooth any ripples or fluctuations caused by load variations and switching activity inside the voltage balancer 252. Further, the voltage balancer 252 can ensure the uniformity of the differential input voltage across the different stages.

Continuing an example operation, assume the scenario where one load is unbalanced compared to the other loads, for example, loads 218A, . . . , 218(N-1), and 218N can be drawing approximately 2 amps at approximately 0.75V, but load 218B is drawing approximately 7 amps at approximately 1V. In this case, ignoring the power loss to understand how the circuit would operate, at the first stage 230A, the input current 244A (I1) is approximately 0.75 amps. The current flowing into the second stage (I2), will be approximately 3.5 amps. The current 244B is I2-I1 (i.e., 3.5 amps-0.75 amps) that is approximately 2.75 amps. The current flowing into the third stage is the same as the first stage which is 0.75 amps since their load currents and load voltages are the same. Then, the current 244C is I3-I2 (i.e., 0.75 amps-3.5 amps) that is -2.75 amps. The currents 244B and 244C will discharge the capacitor 256B with a current of 2.75 amps. Then, the voltage balancer would need to output 2.75 amps to the capacitor 256B to maintain its voltage.

In a more general case, all stages can have different output voltages and load currents. Such case can be illustrated by a superposition of the example of one stages has additional input current, as stated in paragraph [0048].

In addition, the protective Zener diodes 254A, 254B, . . . , 254N can act as protective devices that limits the voltages across the capacitors to protect them from overvoltage.

In one advantage, compared to parallel configurations in the traditional cascaded power supply systems, the output current from the voltage balancer, as described in paragraph [0048], is only 2.75 amps, where in parallel configurations the output current from the VR that converts input voltage 12 volts to the input voltage of each stage 2V is the sum of all input currents into the stages (0.75 amps*5+3.5 amps) which is 7.25 amps. In fact, the voltage balancer would only need to input the current difference between adjacent stages. Therefore, as stated in paragraph [0020], the described stacking mechanism will offer a much larger energy density in conversion as well as efficiency.

Continuing an example operation, in certain implementations, the last stage, the N stage 230N, can be replaced with multiple low dropout regulators (e.g., one or more low dropout regulators) (e.g., LDOs can be voltage regulators designed to maintain a steady output voltage level between the input and output, even when the input voltage is only slightly higher than the desired output voltage). For example, the last stage, the N stage 230N, can be used to power single or multiple low-noise applications. LDOs can introduce less noise compared to multi-stage IVR circuits. Therefore, in low-noise applications, using LDOs can supply cleaner power delivery to sensitive components. Further, LDOs, especially those designed for low noise, can often incorporate better filtering mechanisms. Thus, improving the stability and reducing high-frequency noise in the system and enhancing performance in noise-sensitive applications like precision analog circuits or sensitive sensors. Additionally, while LDOs can offer lower noise, LDOs might sacrifice some efficiency compared to the multi-stage IVRs. In scenarios where noise is not desired, but power efficiency is not a primary concern, LDOs can be a favorable choice for the last stage 230N.

In one example, the last stage, the N stage 230N, can be used to directly feed high voltage applications (i.e., I/O voltage). LDOs can be designed to provide stable output voltages even with varying input voltages. Thus, using LDOs to directly feed high voltage applications can ensure a more stable voltage source, which is desirable for the proper functioning of sensitive electronics. Further, LDOs often come with built-in protection mechanisms, safeguarding the downstream system from voltage fluctuations and potential damage due to overvoltage or other irregularities.

In one example, the last stage, the N stage 230N, LDOs can be used as inputs for an active capacitor, sometimes also called a voltage stabilizer (e.g., since LDOs do not use fly capacitors). In such an implementation, the LDO or a MOSFET with a controlled gate voltage can aid a certain number of loads to reduce the output noise by providing additional regulation when necessary. In certain implementations, the multiple LDOs can be configured in parallel for the above-described schemes.

Figures 3A, 3B:
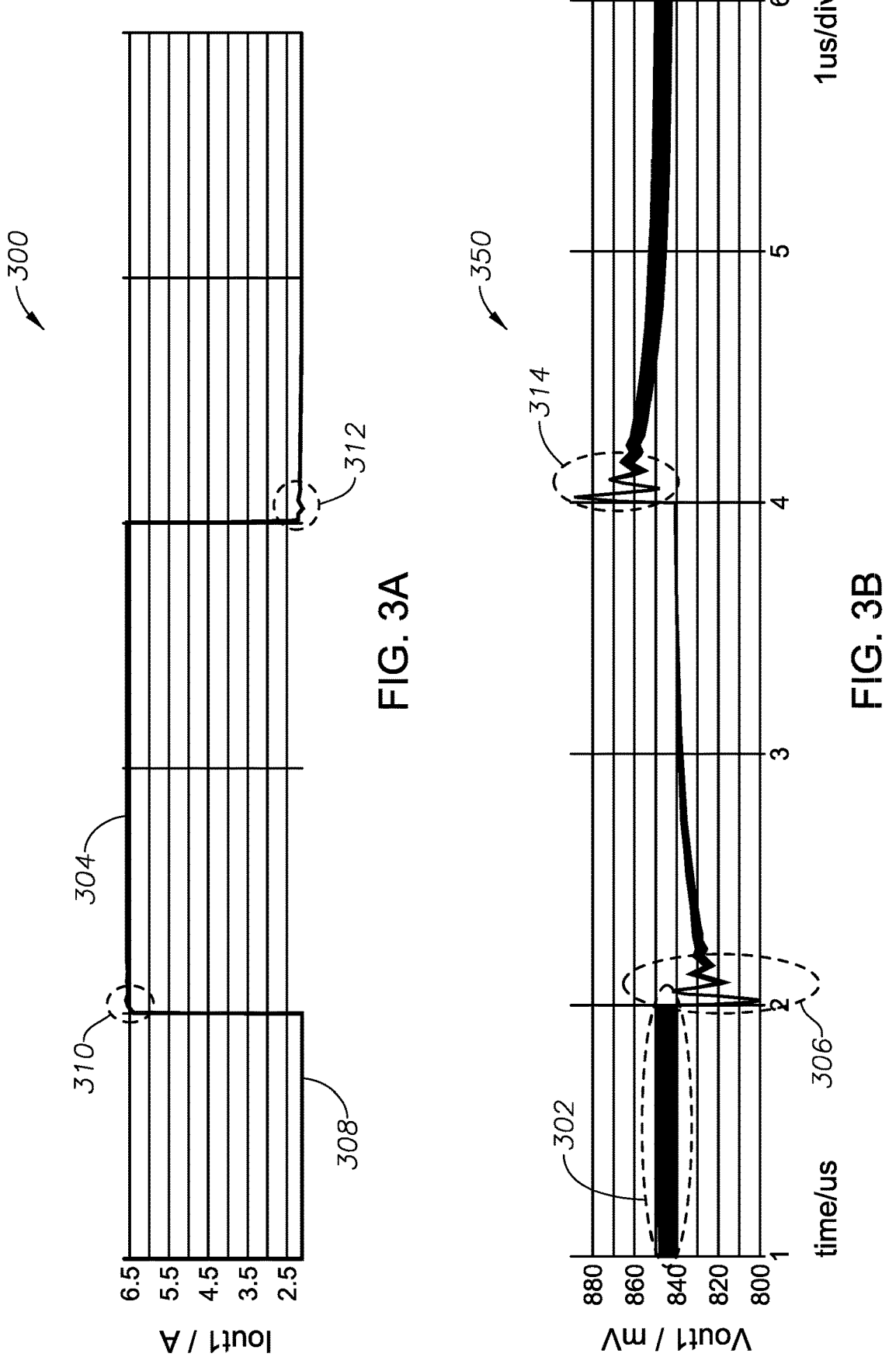
FIG. 3A is a diagram, in accordance with certain implementations.
FIG. 3B is a diagram, in accordance with certain implementations.

FIG. 3A, is a graphical diagram 300 of an output current (Iout1) over time in microseconds of an example stage of an example stacked 2-phase IVR circuit, in accordance with some implementations. As illustrated in FIG. 3A, a load step 304 can increase the amperage draw from the example stage from 2.5 amps to 6.5 amps, and then after the load step 304 back down to 2.5 amps. As illustrated, the Y-axis can represent the output current in amperes (A) and the X-axis can represent the time in microseconds (μs).

The graph 300 can show three distinct phases. At 2.5 amps, the example stage of the example stacked 2-phase IVR circuit operates in a steady state 308. The output steady state 308 can indicate a consistent output current before the load step change. When the load steps up from 2.5 amps to 6.5 amps, there can be a transient response 310. Initially, the output current might drop slightly due to the sudden load increase, showing a dip or a sudden decrease in the current graph. Next, the stage's control mechanisms react to accommodate the load step 304, and the graph would gradually rise to reach the 6.5 amps output level. When the load steps back down from 6.5 amps to 2.5 amps, there can be another transient response 312. The output current can decrease from 6.5 amps back to 2.5 amps, potentially showing a temporary overshoot or undershoot before stabilizing back to the steady state 308 of 2.5 amps.

The steady state output of 2.5 Amps can represent the typical operating condition where the output stage of the example stage of the example stacked 2-phase IVR circuit supplies a constant load of 2.5 amps. Further, this level can indicate the normal, continuous current the output stage of the example stage of the example stacked 2-phase IVR can be designed to deliver to the load without fluctuations. Additionally, the load step 304 of 6.5 amps can represent the common draw or the typical load experienced by a core or a specific component within the output stage of the example stage of the example stacked 2-phase IVR. Further, this can indicate the maximum load that a particular core or component handles during certain operating conditions.

FIG. 3B is a graphical diagram 350 of an output voltage (Vout1) of the example stage of the example stacked 2-phase IVR circuit over time in microseconds in response to the load step 304 in FIG. 3A, in accordance with some implementations. As illustrated in FIG. 3B, the Y-axis can represent the output voltage in millivolts (mV) and the X-axis can represent time in microseconds (μs). At an initial State 302, an output voltage can initially ripple between 850 mV and 840 mV, with a 10 mV threshold and 1.2% variation of the output voltage. In the context of the example stage of the example stacked 2-phase IVR, voltage ripple at the output can indicate the deviation of the output voltage from an intended level. The fluctuation can occur due to the switching action of components, as whose behaviors are described in paragraphs [0026]-[0031], for example, and can be mitigated by the energy storage and release into or out of capacitors and inductors, as described in paragraphs [0026]-[0032].

As an example, when the load steps up, there can be the initial transient response 306, such as a rapid drop in voltage to a threshold of 800 mV (i.e., a 50 mV decrease) within a threshold of the first 200 ns (i.e., 5.9% of the output voltage). Correspondingly, the voltage can then rise to another threshold of 830 mV within the threshold of 200 ns (i.e., 2.4% of the output voltage). Further, after 1 microsecond, the voltage returns to another threshold of 840 mV (i.e., 1.2% of the output voltage).

Moreover, following the load step decrease, another transient response 314 can occur, showing a rise to a threshold voltage of 890 mV (i.e., a 40 mV increase) within the threshold of 200 ns (i.e., 4.7% of the output voltage). Correspondingly, the voltage can 'quickly' fall back to another threshold voltage of 860 mV within 200 ns (i.e., 1.2% of the output voltage). Finally, the output voltage stabilizes back to the initial output voltage of 850 mV after a threshold of 600 ns.

Figure 4A:
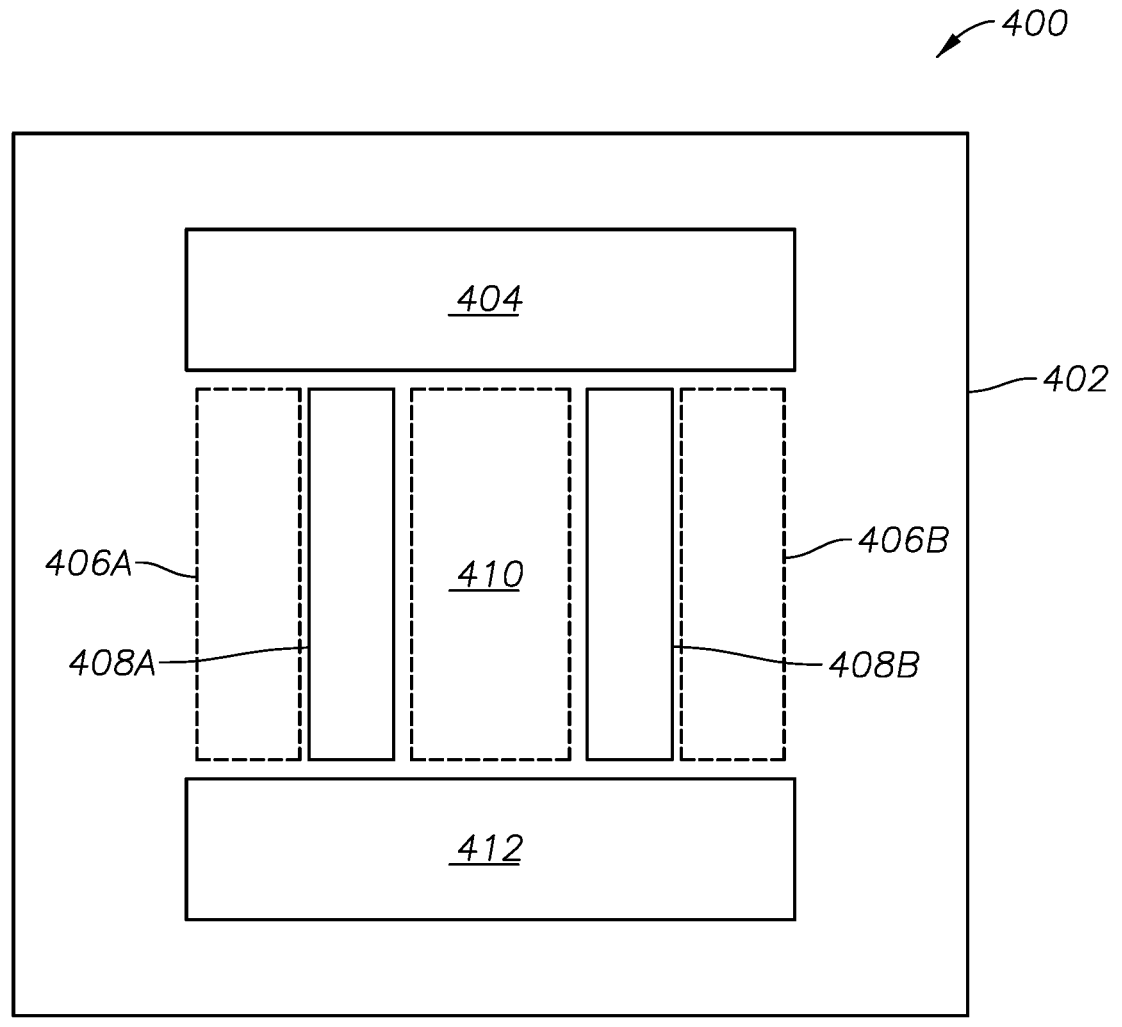
FIG. 4A is a diagram, in accordance with certain implementations.
Figure 4B:
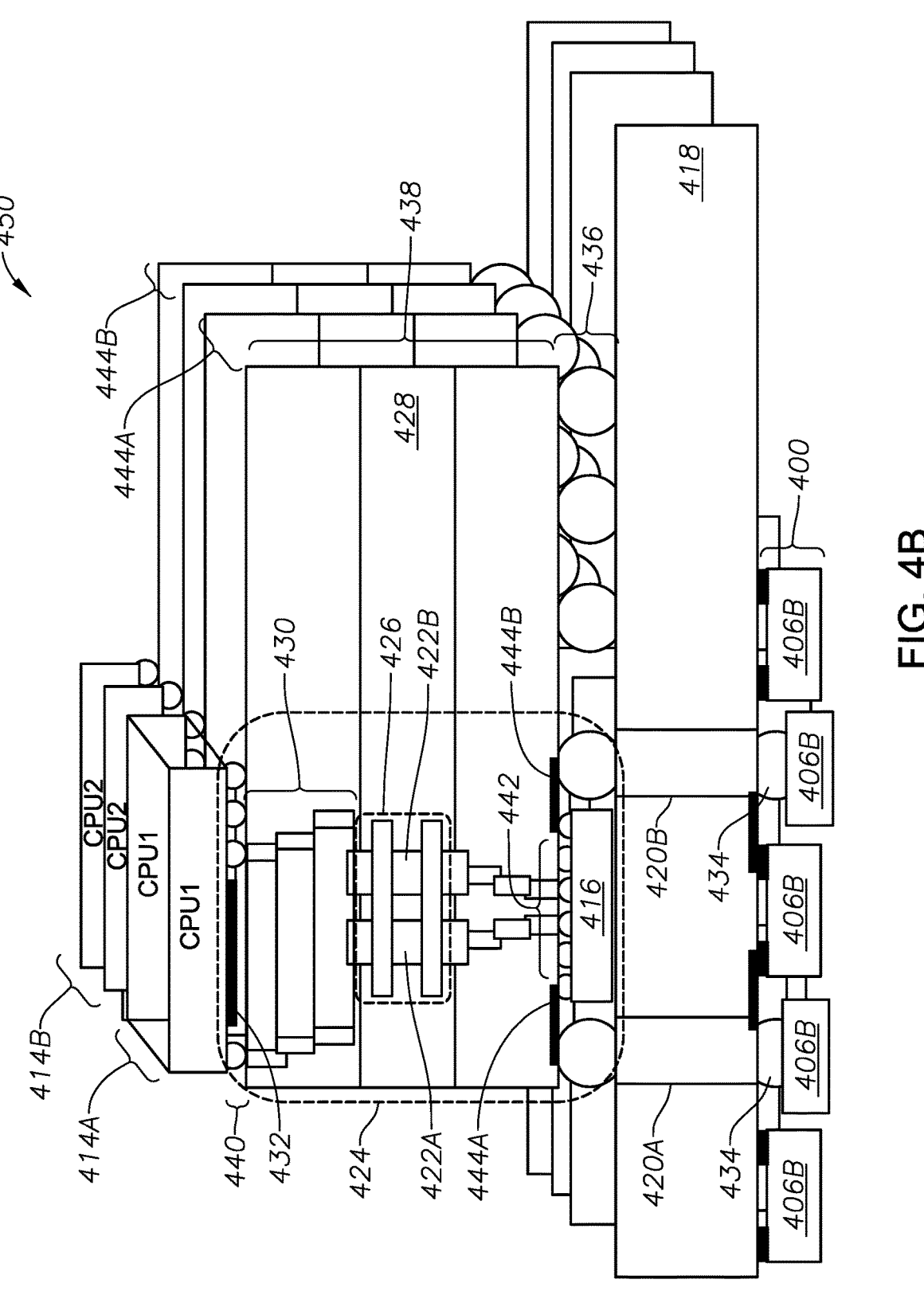
FIG. 4B is a diagram, in accordance with certain implementations.

FIG. 4A is a diagram of an example PCB (Printed Circuit Board) 402 for an example voltage balancer 400, in accordance with some implementations. As illustrated in a top or plan view of FIG. 4A, in one implementation of the example voltage balancer 400, the example PCB 402 can be coupled to the package substrate 438 (e.g., as illustrated in FIG. 4B) through metal traces 434 (i.e., conductive pathways made of metal (typically copper) that can be deposited or etched onto a circuit board's surface; FIG. 4B), the vias through the PCB 420A and 420B, solder balls array 436, and the metal traces inside the package substrate 444 (i.e., package 444) (e.g., 444A, 444B as illustrated in FIG. 4B). On the example PCB 402, there can be a metal plane 404 that can provide the voltage input to the system as Vin 258. Meanwhile, on the example PCB 402, there can be a metal plane 412 that can provide ground of the system and return path of the total input current. Further, coupled to the metal planes 404 and 412, cells of capacitors 406A and 406B (i.e., standard, or predefined functional units that can serve as building blocks for designing ICs or digital systems) can be configured for voltage balancing purposes within the example voltage balancer 400. Additionally, coupled to the metal layer 404 and 412 and to the cells of capacitors 406A and 406B, cells 408A and 408B including FETs (i.e., Field-Effect Transistors can be components used in digital circuit design and integrated circuits commonly used in digital circuits are Metal-Oxide-Semiconductor FETs (MOSFETs)) can be responsible for managing or controlling the voltage balancing operation (e.g., in certain implementations, can include each of the respective Zener diode and capacitor combinations coupled to an example voltage balancer). Furthermore, coupled to the metal planes 404 and 412, the cells of capacitors 406A and 406B, and the cells 408A and 408B can be a cell of decoupling capacitors 410 for each stage in a stacked 2-phase IVR circuit that can provide a stable input voltage to each stage. Additionally, the example voltage balancer 400 can include other metal layers and planes for circuitry around that is routed inside the PCB 402.

In an example operation, the example voltage balancer 400 can be responsible for managing voltage balancing for each stage of a stacked 2-phase IVR circuit. Further, the example voltage balancer 400 can utilize the cells of capacitors 406A and 406B and the cells of FETs 408A and 408B to balance the input voltage for the stacked 2-phase IVR circuits. Additionally, the cells of capacitors 406A and 406B can stabilize voltage levels, while the cells of FETs 408A and 408B can control or manage the voltage distribution across the different stages of the stacked 2-phase IVR circuit. Further, the cells of decoupling capacitors 410 can stabilize and filter the input voltage, reduce noise, and ensure smooth consistent power supply to each stage. Moreover, the metal layer 412 can provide a reference potential and serve as a return path for current flow in the example voltage balancer 400 as well as contributing to stable and safe electrical operation. The example PCB 402 of the example voltage balancer 400 can be dedicated to managing voltage regulation, balancing, and ensuring stable power delivery for each stage of the stacked 2-phase IVR circuit.

FIG. 4B is a diagram of an example stacked 2-phase IVR circuit layout 450, in accordance with some implementations. As illustrated in an isometric view of FIG. 4B, the example voltage balancer 400 can include the capacitors 406A and 406B, and the switching cells 408A and 408B, as mentioned in paragraph [0061]. The decoupling capacitors 410 for each stage may be identical to decoupling capacitors 256A, 256B, . . . , 256N in FIG. 2. The protective Zener diodes 254A, 254B, . . . , 254N can be placed adjacent to the decoupling capacitors or integrated in the FET cells 408A and 408B. The 2-phase IVR 424, also shown in FIG. 1B, includes the integrated circuit 416 configured to integrate switches 108A, 108B, 108D, 108E, 110A, 110B, 110C, 110D, 108C, 108F, and fly capacitors 114A, 114C together. The inversely coupled inductors 112A-112D are formed by the structure of 426 (as illustrated herein). Central Processing Unit (CPU)1 414A and CPU2 414B (i.e., core 1 and core 2 414A, 414B; first and second processing units) are representative of the load 218A, 218B and so forth as similarly shown in FIG. 2.

As illustrated in FIG. 4B, the example stacked 2-phase IVR circuit layout 450 can be optimized for delivering stable and efficient power to individual computing cores, such as core 1 414A and core 2 414B, within a larger processing unit, in certain implementations (not shown). Further, the example stacked 2-phase IVR circuit layout 450 can be optimized for powering individual cores or CPUs, such as core 1 414A and core 2 414B, within the larger processing unit. Additionally, the example stacked 2-phase IVR circuit layout 450 can include multiple IVR circuits, such as the IVR 424, stacked one upon the other.

Additionally, the via 420A can route a first voltage and the via 420B can route a second voltage where the difference between the first and second voltage is a differential voltage as the differential input voltage into each stages 242A, 242B, . . . , 242N as in FIG. 2.

Coupled through metal traces 442 and vias 430 to the cell of IVR FETs 416 can be coupled inductors 422A and 422B. As illustrated in FIG. 4B, the coupled inductors 422A and 422B can be part of the IVR 424 and can be electromagnetically coupled to a magnetic core 426 within a metal layer 428. Further, the coupled inductors 422A and 422B can output Vdd for the core 1 414A through vias 430. Moreover, the Vdd can be coupled to a stabilizing capacitor 432 interfaced between the coupled inductors 422A and 422B and the core 1 414A through the vias 430. In various implementations, the stabilizing capacitor 432 can be a D2D SiCap (Direct-to-Die Silicon Capacitor) that is a component integrated directly onto the silicon of the chip or die. Further, the D2D SiCap can be designed to provide localized or on-chip capacitance, enhancing power delivery efficiency and stability, especially in scenarios where rapid power fluctuations can be to be managed, such as in high-performance processors. In some implementations, the D2D SiCap can be around 1 microfarad (1 uF) D2D silicon capacitor at the output stage.

In an example operation, the example stacked 2-phase IVR circuit layout 450 can employ a sophisticated system of FETs, such as the cell of IVR FETs 416, coupled inductors, such as the coupled inductors 422A and 422B, and capacitors, such as the stabilizing capacitor 432 to regulate voltage and the fly capacitor within the cell of IVR FETs 416. Each stage, such as stage 1 444A and stage 2 444B (i.e., first and second packages 444A, 444B), of the example stacked 2-phase IVR circuit layout 450 can represent a dedicated power supply for individual computing cores, such as the core 1 414A and the core 2 414B. Further, the stages can work in concert to deliver stable and regulated power to the cores. Moreover, the isolation of the IVR cells can ensure each core receives consistent and precise voltage level for optimal computing performance. Furthermore, the use of dual inductor pairs and cells of FETs can aid in balancing and managing the voltage distribution and optimizing power delivery across the cores.

In some implementations, with reference to FIGS. 4A-4B, a printed circuit board (PCB) (e.g., 402) is configured to house: the voltage balancer (e.g., voltage balancer 400); and each of the respective Zener diode (e.g., integrated in FET cells 408A, 408B or adjacent to decoupling capacitor 410) and capacitor combinations (e.g., cells of capacitors 410, 406A, 406B) coupled to the voltage balancer (400); where the PCB (e.g., 402) can be coupled to an integrated circuit that comprises one or more processing units (e.g., core 1

414A, core 2 414B), and a package (444A, 444B) comprising each of the two-phase IVRs (424).

Figure 5A:
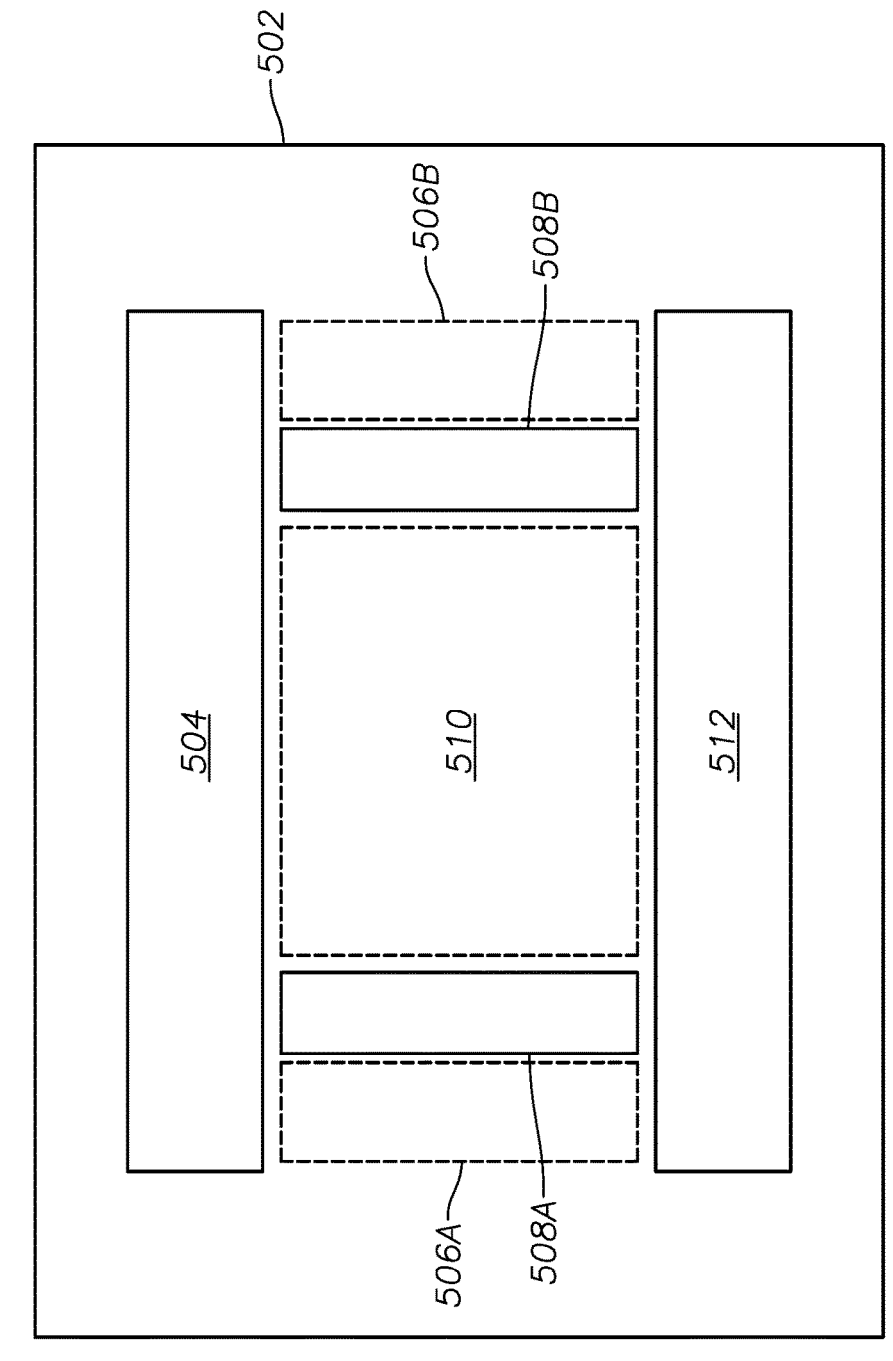
FIG. 5A is a diagram, in accordance with certain implementations.

FIG. 5A is a diagram of an example PCB 502 of an example combination voltage balancer and IVR circuit PCB layout 500, in accordance with some implementations. As illustrated in a top or plan view of FIG. 5A, the example combination voltage balancer and IVR circuit PCB layout 500 can provide a sophisticated power management setup for dual-voltage (i.e., 12V/48V) applications. Further, the example combination voltage balancer and IVR circuit PCB layout 500 can include distinct sections, such as cells of capacitors 506A and 506B that can provide voltage balancing, cells of FETs 508A and 508B that can provide voltage control, and cells of IVR FETs (with decoupling capacitors) 510 that can provide stable and regulated power.

As illustrated in FIG. 5A, a metal plane 504 can represent a main power input with a dual-voltage capability, that may allow the system to handle both 12V and 48V power inputs. Further, the cells of capacitors 506A and 506B can represent the voltage balancer capacitors that can be configured to maintain and regulate voltage balance within the system. Moreover, the cells of FETs 508A and 508B can depict the voltage balancer FETs that can be configured to control and manage voltage balancing operations. Furthermore, the cells of IVR FETs 510 can represent the decoupling capacitors and the IVRs that can be configured to stabilize the power supply and provide pre-core voltage regulation. Another metal plane 512 can represent a grounding connection that can provide a reference point and return path for the entire power delivery system.

In an example operation, the cells of capacitors 506A and 506B and the cells of FETs 508A and 508B can work in conjunction to maintain balanced voltage levels between the 12V and 48V inputs. Further, the cells of IVR FETs 510 with the decoupling capacitors can stabilize the power supply and provide regulated clean power output to the system components while ensuring isolation and efficient voltage regulation. Overall, the example combination voltage balancer and IVR circuit PCB layout 500 can provide a robust and versatile power management system capable of handling dual-voltage inputs while ensuring stable and regulated power delivery to the connected devices or systems.

Figure 5B:
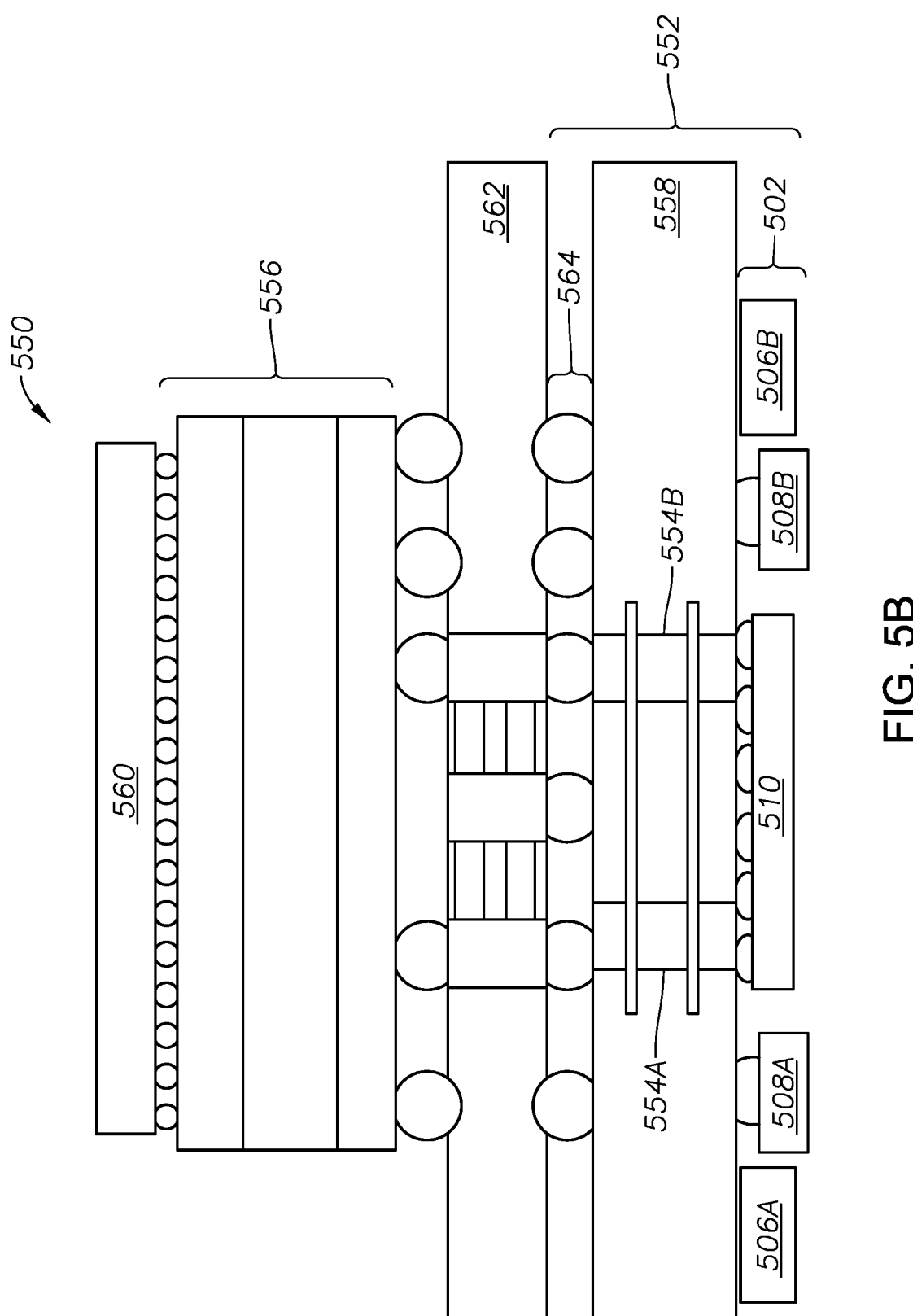
FIG. 5B is a diagram, in accordance with certain implementations.

FIG. 5B is a diagram of an example package layout 550 of an example power supply module 552 coupled with an example package substrate 556 (i.e., substrate, package), in accordance with some implementations. According to certain implementations, in contrast to the system shown in FIG. 4A and FIG. 4B, the system in FIG. 5B has an independent power supply module 552 that would not need to be manufactured together with the substrate 556 and load chip 560 (i.e., integrated circuit). Advantageously, this can help risk mitigation in the real product design as well as managing the supply chain. As illustrated in a front view of FIG. 5B, the example IVR layout 552 can include embedded coupled inductors 554A and 554B in the PCB or substrate 558 and voltage balancer (e.g., the cells of capacitors 506A and 506B along with the cells of FETs 508A and 508B). Further, the example IVR with related switches and fly capacitors can be integrated in the IC 510.

As illustrated in FIG. 5B, the example IVR layout 552 with the embedded inductors 554A and 554B can provide a low-cost implementation where the example IVR layout 552 and load balancer, along with support circuitry, can be separate from the substrate 556. Instead, the example IVR layout 552 with the embedded inductors 554A and 554B can be coupled via solder balls 564 to the vias through PCB 562 that can have substrate 556 mounted thereon.

In an example operation, the example package layout 550 would still maintain voltage regulation and load balancing but can provide the option to separate the power management components from the load IC; helping a system designer pick a desired supplier for different components and integrate them together. By doing so, costs can potentially be reduced as these elements are not integrated into the substrate 556. Further, the example IVR layout 552, in combination with the embedded coupled inductors 554A and 554B and associated circuitry, can manage voltage fluctuations and ensure simple and low-risk development of not only the power delivery to the load IC 560 on the substrate 556, but also other signals through other components on the PCB 562 and substrate 556.

In some implementations, with reference to FIGS. 5A-5B, a first printed circuit board (PCB) (e.g., 500, 558, 562) may house the voltage balancer; each of the respective Zener diode (e.g., integrated in FET cells 508A, 508B or adjacent to IVR FETS with decoupling capacitors 510) and capacitor combinations (e.g., 506A, 506B); coupled to the voltage balancer; and each of two-phase IVRs (e.g., IVR FETS 510). Also, a second PCB may house an integrated circuit (IC) comprising one or more processing units (e.g., load IC 560). Advantageously, in such implementations, the two-phase IVRs (e.g., IVR FETS 510) would be distinct from and not integrated in a package substrate 556.

Figure 6A:
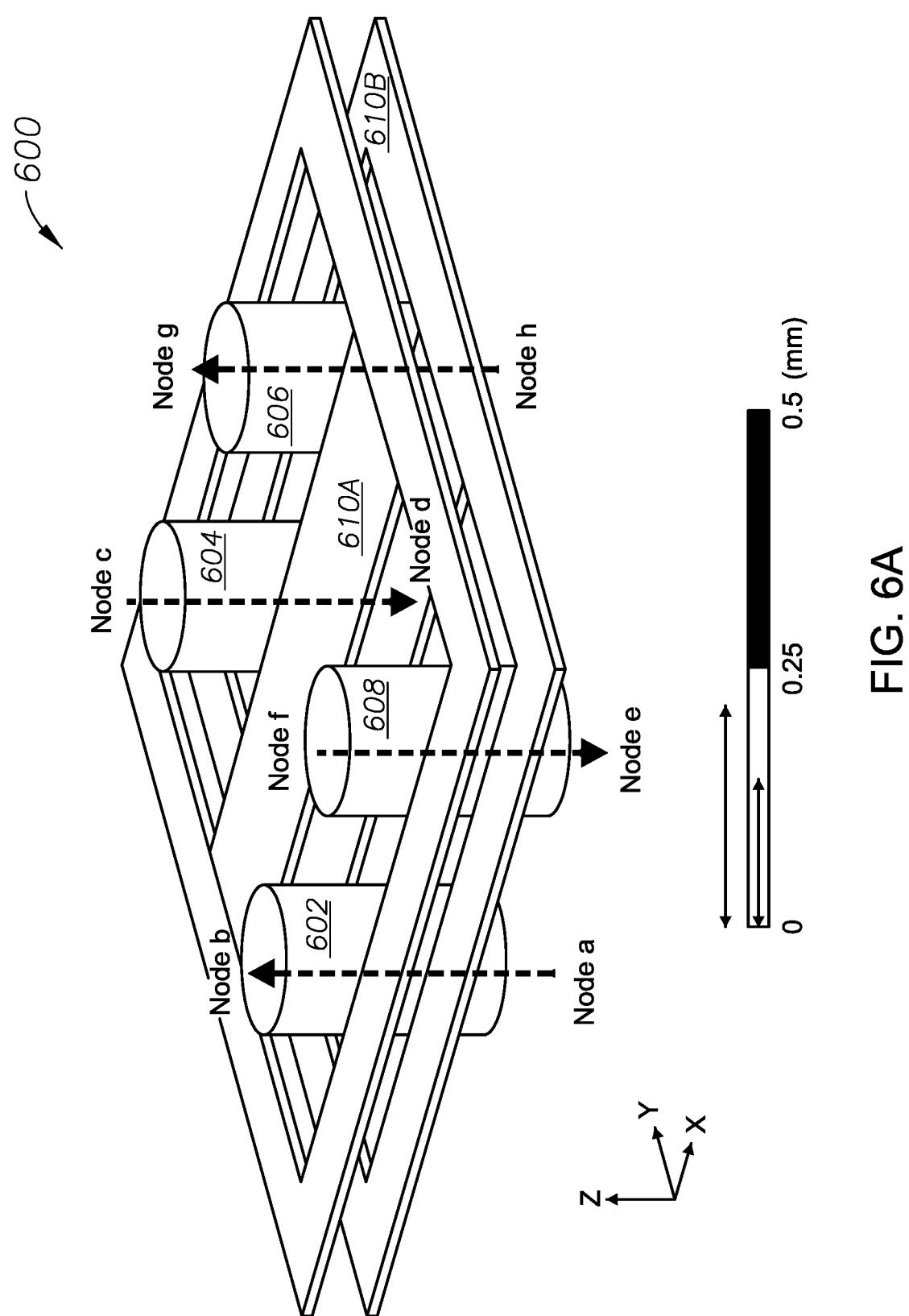
FIG. 6A is a diagram, in accordance with certain implementations.
Figure 6B:
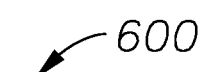
FIG. 6B is a diagram, in accordance with certain implementations.
Figure 6B:
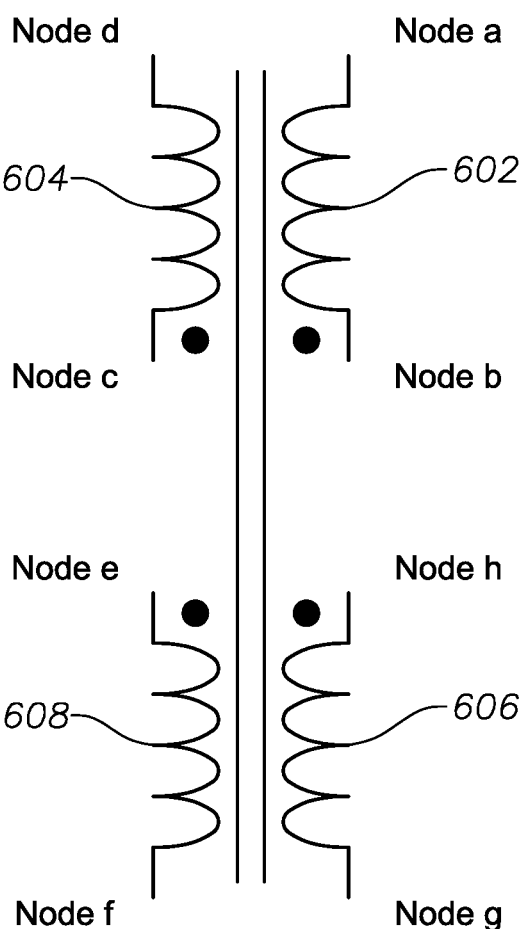

FIG. 6A is a diagram representation of example inversely coupled inductor pairs 600, in accordance with some implementations. FIG. 6B is a schematic diagram of the example inversely coupled inductor pairs 600, in accordance with some implementations. Such inversely coupled inductor pairs 600 can be utilized in various example implementations, as described herein, e.g., with reference to FIGS. 1B and 2. As illustrated in FIGS. 6A and 6B, the example inversely coupled inductor pairs 600 can feature four inductors, L1 602, L2 604, L3 606, and L4 608, arranged in two pairs with a shared magnetic core 610A and 610B. In some implementations, each inductor, of inductors L1 602, L2 604, L3 606, and L4 608, measures 125 micrometers in diameter and 187.5 micrometers in height and can have an inductance range of approximately 1 to 5 nanohenries (nH).

In an example operation, the inductors, L1 602, L2 604, L3 606, and L4 608, can be paired as follows: L1 602 and L2 604 can form one pair, while L3 606 and L4 608 can form the other pair. As illustrated by the dotted arrows, current flow in the inductors L1 602 and L3 606 can flow from the bottom of L1 602 and L3 606 to the top (i.e., from node a to node b on L1 602 and from node h to node g on L3 606). Correspondingly, this current flow can represent the secondary inductors providing current flow to the stabilizing capacitor/load. Conversely, current flow in the inductors L2 604 and L4 608 can flow from the top of the inductors to the bottom (from node c to node d on L2 and from node f to node e on L4). Correspondingly, this current flow can represent the primary inductors providing current flow from ground.

Across the magnetic core 610A and 610B, node d aligns with node a, node c with node b, node e with node h, and node f with node g. Further, the example inversely coupled inductor pairs 600 can represent a coupled inductor configuration that can enable efficient energy transfer between the inductors, L1 602, L2 604, L3 606, and L4 608, while maintaining a smaller size compared to traditional IVRs. Moreover, the shared magnetic core 610A and 610B can facilitate the coupling of magnetic flux between the inductors that can aid in energy transfer and can enhance the overall performance of the system. Furthermore, the example inversely coupled inductor pairs 600 can optimize space utilization and inductor efficiency for the intended application.

The subject matter of the claims is not limited to the implementations and illustrations provided herein, the intention is that modified forms of those implementations including portions of implementations and combinations of elements of different implementations be in accordance with the claims. In the development of any such implementation, there is an appreciation as in any engineering or design project, that numerous implementation-specific decisions can be made to achieve the developers' specific goals, such as compliance with system-related and business-related constraints, that vary from one implementation to another. Moreover, while such a development effort is complex and time consuming, there is an appreciation for those of ordinary skill having benefit of these implementations the development would nevertheless be a routine undertaking of design, fabrication, and manufacture.

Reference has been made in detail to various implementations, examples of that can be illustrated in the accompanying drawings and figures. In the above description, numerous specific details can be set forth to provide a thorough understanding of the implementations provided herein. However, the implementations provided herein can be practiced without these specific details. In some other instances, well-known methods, procedures, components, circuits, and networks have not been described in detail so as not to unnecessarily obscure details of the implementations.

Although the terms first, second, and the like can be used herein to describe various elements, these elements should not be limited by these terms. These terms can be used to distinguish one element from another. For example, a first element can be termed a second element, and, similarly, a second element is able to be termed a first element. The first element and the second element can be both elements, respectively, but they are not to be considered the same element.

The terminology used in the description of the implementations provided herein is for the purpose of describing implementations and is not intended to limit the implementations provided herein. As used in the description of the implementations provided herein and appended claims, the singular forms a, an, and they can be intended to include the plural forms as well, unless the context clearly indicates otherwise. The term and/or as used herein refers to and encompasses all possible combinations of one or more of the associated listed items. The terms includes, including, comprises, and/or comprising, when used in this specification, specify a presence of stated features, integers, steps, operations, elements, and/or components, but do not preclude the presence or addition of one or more other features, integers, steps, operations, elements, components and/or groups thereof.

While the foregoing is directed to implementations of various techniques described herein, other, and further implementations can be devised in accordance with the implementations herein, that may be determined by the claims that follow.

Although the subject matter has been described in language specific to structural features and/or methodological acts, the subject matter defined in the appended claims is not necessarily limited to the specific features or acts described above. Rather, the specific features and acts described above can be disclosed as example forms of implementing the claims.

What is claimed is:

1. A circuit comprising:
a trio of first switches;
a pair of second switches;
a pair of inductors comprising a primary inductor magnetically coupled to a secondary inductor; and
a first capacitor, wherein:
    the circuit is configured to regulate a voltage to a load; and
    the circuit is configured to isolate the load from a voltage input.

2. The circuit of claim 1, wherein:
the voltage input is a differential voltage input comprising first and second nodes, wherein the first and second nodes are configured to receive respective first and second voltages; and
the circuit is configured to regulate the voltage to the load based on a differential voltage provided by the differential voltage input.

3. The circuit of claim 1, further comprising:
a second capacitor configured to stabilize an output voltage, wherein:
    the second capacitor is coupled to a third voltage and the secondary inductor; and
    the third voltage comprises 0 volts.

4. The circuit of claim 3, wherein:
the secondary inductor and the second capacitor of the circuit are coupled to the load; and
the pair of inductors are configured to respond to a voltage droop of an output voltage based on inductance values of the pair of inductors and the second capacitor.

5. The circuit of claim 1, wherein:
the trio of the first switches and the pair of second switches are configured for distinct circuit operation; and
an out-of-phase switching cycle is configured to provide independent circuit operation between the trio of the first switches and the pair of the second switches.

6. The circuit of claim 2, wherein:
the first capacitor is coupled between a first switch of the trio of the first switches and a second switch of the trio of the first switches;
the first switch and a second switch of the trio of the first switches is configured to provide a first electrical pathway with the first node, the first capacitor, and the second node; and
a third switch of the trio of the first switches is configured to provide a second electrical pathway between the primary and the secondary inductors and the load.

7. The circuit of claim 1, wherein:
the circuit is configured to control a duty cycle of the pair of the second switches to provide output voltage regulation.

8. The circuit of claim 1, wherein:
the pair of second switches are configured to provide a third electrical pathway between the first capacitor, the pair of inductors and the load.

9. The circuit of claim 1, wherein:
the first capacitor is configured to store a first charge in response to an activation of the trio of the first switches and a dissipation of the first charge in response to an activation of the pair of the second switches.

10. The circuit of claim 1, wherein:
the load comprises one or more cores, and
the one or more cores comprises a processing unit of one or more processing units.

11. A circuit comprising:
a differential voltage input comprising first and second nodes, wherein the first and the second nodes are configured to receive respective first and second voltages;
a first isolated voltage regulator (IVR) comprising a first pair of inductors; and
a second IVR comprising a second pair of inductors, wherein the first and the second pair of inductors are inversely coupled, wherein
the circuit is configured to regulate a voltage to a load; and
the circuit is configured to isolate the load from the differential voltage input.

12. The circuit of claim 11, wherein:
the first and the second pair of the inductors are configured to share a magnetic core; and
the magnetic core is configured to enable a magnetic field produced by the first pair of the inductors to impact a magnetic field of the second pair of the inductors.

13. The circuit of claim 11, wherein:
the first and the second pair of the inductors are configured to reduce output voltage ripple; and
the output voltage ripple comprises one or more fluctuations in an output voltage of the circuit.

14. The circuit of claim 11, wherein:
in response to a load step up, the first and the second pair of the inductors are configured to reduce output voltage droop; and
the output voltage droop comprises a reduction in an output voltage of the circuit based on a load change.

15. The circuit of claim 11, wherein:
the first and the second pair of inductors are configured to respond to a voltage droop of an output voltage based on inductance values of the pair of inductors.

16. A circuit comprising:
a voltage balancer;
two or more stages, wherein:
    each stage of the two or more stages comprises:
        a two-phase isolated voltage regulator (IVR) comprising at least a pair of inversely coupled dual inductors and a differential voltage input, and
        a respective Zener diode and capacitor combination coupled to the voltage balancer and the two-phase IVR, and
        a load coupled to the two-phase IVR; and
    wherein the two or more stages are coupled in series.

17. The circuit of claim 16, wherein:
a last stage of the two or more stages is coupled to one or more low dropout regulators (LDOs); and
the one or more LDOs are configured to maintain an approximately constant output voltage.

18. The circuit of claim 16, wherein:
the differential voltage input of a first stage of the two or more stages comprises first and second nodes configured to receive respective first and second voltages; and
the differential voltage input of a second stage of the two or more stages comprises the second node and a third node configured to receive the second voltage and a third voltage, respectively.

19. The circuit of claim 16, further comprising:
a printed circuit board (PCB) configured to house:
    the voltage balancer; and
    each of the respective Zener diode and capacitor combinations coupled to the voltage balancer, wherein the PCB is coupled to an integrated circuit comprising one or more processing units and a substrate package comprising each of the two-phase IVRs.

20. The circuit of claim 16, further comprising:

a first printed circuit board (PCB) configured to house:

the voltage balancer;

each of the respective Zener diode and capacitor combinations coupled to the voltage balancer; and each of two-phase IVRs; and a second PCB configured to house:

an integrated circuit (IC) comprising one or more processing units.

* * * * *